United States Patent

[11] 3,619,150

| [72] | Inventors | Royden Carrington Rinker<br>Sidney, N.Y.;<br>Joseph Michael Biglin, Manchester, Conn. |
|---|---|---|
| [21] | Appl. No. | 860,122 |
| [22] | Filed | Sept. 22, 1969 |
| [45] | Patented | Nov. 9, 1971 |
| [73] | Assignee | The Borden Company<br>New York, N.Y.<br>Continuation of application Ser. No.<br>599,396, Dec. 6, 1966, now abandoned. |

[54] ABRASIVE ARTICLE AND NONLOADING COATING THEREFOR
6 Claims, No Drawings

[52] U.S. Cl. .................................................. 51/295,
51/298, 51/298.1, 51/299
[51] Int. Cl. ..................................................... B24d 1/00,
C08g 51/12

[50] Field of Search .......................................... 51/295,
298, 299

[56] References Cited
UNITED STATES PATENTS

| 2,019,055 | 10/1935 | Noble ........................ | 51/299 |
| 2,111,006 | 3/1938 | Robie ......................... | 51/298.1 |
| 2,443,698 | 6/1948 | Snyder ....................... | 51/298 |
| 2,768,886 | 10/1956 | Twombly .................... | 51/295 |
| 2,893,854 | 7/1959 | Rinker et al. ............... | 51/304 |

Primary Examiner—Donald J. Arnold
Attorney—John L. Sigalos

ABSTRACT: A flexible coated abrasive article is formed having a nonloading coating applied over the size coating, said nonloading coating comprising a mixed resin composition of a thermosetting resin and either a thermoplastic or elastomeric resin and a water-dispersible metallic soap dispersed throughout said resin composition.

ABRASIVE ARTICLE AND NONLOADING COATING THEREFOR

This application is a continuation of application Ser. No. 599,396 filed Dec. 6, 1966, now abandoned.

This invention relates to coated abrasive articles and to the methods for making them, and has particular reference to the preparation of flexible abrasive articles such as sandpaper.

A major problem in the use of abrasive articles has been the clogging of the abrading surface with the waste removed from the material being abraded. Thus, when sandpapering wood surfaces or painted surfaces the wood or paint being removed loads and clogs the abrasive surfaces and prevents maximum usefulness of the abrasive article.

Attempts have been made in the past to prevent loading by coating the abrasive grains with greases, waxes, graphite and other oily material, including soaps, and certain soap containing resins as set forth in U.S. Pat. No. 2,893,854 and British Pat. No. 712,718. The undesirability of the use of the oily materials is set forth in U.S. Pat. No. 2,893,854, but the use of a thermoplastic film as set forth therein is also not completely suitable. The thermoplastic resins there used must be applied to the abrasive article as solutions in volatile organic liquids. These are dangerous to use, because of their flammability and cannot be used in plants not capable of handling volatile materials.

It has now been found possible to make coated abrasive articles with thermosetting resin compositions applied from aqueous solutions thereby avoiding the hazards of volatile solvents. Also the coated abrasive articles of the invention have superior properties relative to binding the adhesive grains to the backing.

Briefly stated, the present invention comprises abrasive articles having a nonloading top coating comprising a cured resin composition having particles of a water-dispersible metallic soap distributed substantially uniformly therethrough, said resin composition comprising a formaldehyde-containing thermosetting resin and a resin compatible therewith selected from the group consisting of elastomeric resins and thermoplastic resins.

While this invention has application to abrasive articles generally such as grinding wheels, abrasive blocks, etc., it is especially suitable for flexible abrasive articles such as sandpaper and will be discussed in connection therewith.

Sandpaper is prepared by adhering abrasive grains, such as garnet, silicon carbide, aluminum oxide, or standard abrasive grits, to a flexible backing such as paper, cloth, or plastic.

As to the make or adhesive used to bind the grains to the backing any urea-formaldehyde or phenol-formaldehyde abrasive adhesive or combination thereof, or proteinaceous glue can be used. It is preferred to use an animal glue, either hide or bone glue for this purpose. After the grains are adhered to the backing, there is then applied over the entire surface thereof a size, which is again preferably a proteinaceous glue, such as hide or bone glue, but can be a thermosetting resin, such as a urea-formaldehyde or phenol-formaldehyde resin.

The preparation of sandpaper discussed above and the various materials (paper, make, and size) set forth are those known and presently utilized in preparing sandpaper.

The unique aspect of the present invention is the nonloading coating which is applied over the sandpaper after it is prepared as set forth above. Such coating comprises a metallic water insoluble soap of a $C_{16}$–$C_{18}$ saturated fatty acid, preferably zinc stearate, distributed substantially uniformly through a cured resin composition. Other soaps that can be used are calcium stearate, lead stearate, barium stearate, strontium stearate, magnesium stearate, aluminum stearate, cadmium stearate, the corresponding palmitates, or mixtures of any of the foregoing materials. As applied, the coating comprises from about 5 to about 15 parts by weight of soap, the resin composition from about 5 to about 15 parts by weight, and the solvent 50 to 80 parts by weight to give a total of 100 parts by weight coating. In some instances it may also be desired to add pigments or fillers. The following table shows the preferred and illustrative proportions of components of the coating as applied.

|  | Parts by Weight for 100 Parts Coating | |
|---|---|---|
|  | Illustrative | Preferred |
| Soap | 5–15 | 8–10 |
| Resin Composition | 5–15 | 8–10 |
| Solvent | 50–80 | 55–65 |
| Filler | 0–25 | 15–20 |

The solvent is preferably water alone, but lesser amounts, up to 50 parts by Weight of organic solvents, particularly lower alcohols ($C_1$–$C_4$), such as methanol, ethanol, or butanol can be used in conjunction with the water. One may also use ketones and esters commonly used to solvate polyvinyl alcohol.

The preferred solids combination of the nonloading coating as it is to be applied should be about 20 percent (40 percent if a filler is included) solids although up to 60 percent solids can be used.

The resin composition comprises a formaldehyde-containing thermosetting resin and a resin compatible therewith selected from the group consisting of elastomeric resins and thermoplastic resins in the ratio of about 1 to about 2 parts by weight of the thermosetting resin for each part by weight of the compatible resin.

The formaldehyde-containing thermosetting resin can be urea-formaldehyde, phenol-formaldehyde, melamine-formaldehyde, resorcinol-formaldehye, or mixtures thereof. Of these, urea-formaldehyde is preferred.

The elastomeric resin can be neoprene, chloroprene, natural rubbers, butadiene-styrene, butadiene-acrylonitrile, and mixtures thereof that are compatible with the thermosetting resin.

The thermoplastic resin can be any made from ethenoid-polymerizable monomers such as vinyl esters, vinyl ethers, vinyl alcohols, acrylic esters, methacrylic esters, and mixtures thereof which are compatible with the thermosetting resin. Preferred is the polyvinyl alcohol since the hydroxyl groups thereof react with the methylol groups of the thermosetting resin to form a hemiacetal. This insolubilizes the polyvinyl alcohol, upon heating when heat is used to cure the composition. Other specific examples are polyvinyl acetate, polyvinyl chloride, methyl acrylate, ethyl acrylate, methyl methacrylate, and ethyl methacrylate.

When an animal glue size is used the thermosetting resin has a further advantage in that it donates formaldehyde to tan the glue making it more water resistant. Regardless of the size used, however, the resin composition is such that while having the requisite flexibility when cured, can be applied as an aqueous nonflammable system and when cured, because of the thermosetting resin present, will be a tough, permanent fiber which is highly water resistant.

The metallic water-insoluble soap used may be any commonly used in the manufacture of coated abrasive articles as set forth in U.S. Pat. No. 2,893,854.

The invention will be further described in connection with the following examples which are set forth for the purposes of illustration only and wherein proportions are in parts by weight unless specifically stated to the contrary.

EXAMPLE 1

A flexible sandpaper was prepared by adhering silicon carbide to a 40 pound basis weight paper backing using animal hide glue as the make. A size coat of animal glue was then applied. All of the foregoing were known components applied in the usual manner in making sandpaper on a standard sandpaper making machine.

Roller coated over the abrasive side of the paper was the following coating composition:

| | Parts |
|---|---|
| Resin component | 32.50 |
| Zn Stearate | 15.00 |
| Talc | 6.50 |
| Water | 45.50 |
| Tergitol No. 7 (sodium alkyl sulfate | 0.50 |
| | 100.00 |

The composition was prepared by first dissolving the resin component in water. The talc was then added and the entire composition mixed until smooth. The Tergitol was then added to the composition.

After application of this coating the sandpaper was dried. The sandpaper was nonloading, flexible and the abrasive grains were firmly adhered to the backing.

The resin component of the coating set forth above was prepared from the following ingredients:

| | Parts |
|---|---|
| Water, cold | 75.32 |
| Formaldehyde, 44% UNH | 12.83 |
| Polyvinyl alcohol | 5.64 |
| Urea, microprilled | 5.64 |
| Sodium Hydroxide, 25%, Sol. | 0.33 |
| Formic Acid, 30% | 0.24 |
| | 100.00 |

The water, formaldehyde, and formic acid were admixed and the polyvinyl alcohol added gradually so as to prevent lumping. After addition of the polyvinyl alcohol was completed the mixture was heated to 100° C. and held at that temperature for 30 minutes. The mixture was then cooled to 30–35° C. and the urea added and dissolved. The sodium hydroxide was then added to adjust the pH to 9.5–10.5.

EXAMPLE 2

The process and compositions of example 1 were used except that garnet was used in place of silicon carbide and 230 pound cylinder paper in place of the paper used therein. Again a nonloading, flexible sandpaper.

EXAMPLE 3

Abrasive discs for sanding solder joints in automotive body assemblies are prepared by first adhering aluminum oxide grains on 30 pt. vulcanized fiber sheets with a standard phenol-formaldehyde make. A standard phenol-size is applied and thereover the coating composition of example 1. After drying the sheet is stamped out in the form of abrasive discs.

EXAMPLE 4

The process and compositions of example 1 were followed except that the coating composition was made of the following components:

| | Parts |
|---|---|
| Resin component | 65.43 |
| Zn Stearate | 10.72 |
| Talc | 16.08 |
| Titanium Dioxide | 1.61 |
| Isopropyl alcohol | 6.16 |
| | 100.00 |

EXAMPLE 5

The process and compositions of example 1 were followed except that the coating composition was made of the following components:

| | Parts |
|---|---|
| Resin component | 28.60 |
| Zn Stearate | 25.00 |
| Talc | 4.65 |
| Water | 32.45 |
| Titanium Dioxide | 3.55 |
| Isopropyl alcohol (99%) | 5.75 |
| | 100.00 |

EXAMPLE 6

The process and compositions of example 1 are used except that the polyvinyl alcohol used in the resin component of the coating composition is replaced by equal parts by weight, in turn, of each of the following: polyvinyl acetate, polyvinyl chloride, methyl acrylate, ethyl acrylate, methyl methacrylate, and ethyl methacrylate. In each instance a nonloading, flexible sandpaper is obtained.

EXAMPLE 7

The process and compositions of example 1 are used except that the polyvinyl alcohol used in the resin component of the coating composition is replaced by equal parts by weight, in turn, of each of the following: neoprene, chloroprene, natural rubber, butadiene-styrene, and butadiene-acrylonitrile. In each case a nonloading, flexible sandpaper is obtained.

EXAMPLE 8

The process and compositions of examples 6 and 7 are used except that the urea-formaldehyde used in the resin component of the coating composition is replaced by equal parts by weight, in turn, of each of the following: phenol-formaldehyde, melamine-formaldehyde, and resorcinol-formaldehyde. Equally good results are obtained.

It will be understood that it is intended to cover all changes and modifications of the examples of the invention herein chosen for the purpose of illustration which do not constitute departures from the spirit and scope of the invention.

In the claims:

1. In an abrasive article of manufacture which includes a backing, abrasive grains, a make securing said abrasive grains to said backing and a size applied over said abrasive grains, the improvement comprising a nonloading coating applied to said article over said size coating which comprises
   A. from 5 to 15 parts by weight of a resin composition that is water-insoluble upon curing comprising
      a. a thermosetting resin selected from phenol-formaldehyde, urea-formaldehyde, melamine-formaldehyde, resorcinol-formaldehyde and mixtures thereof and
      b. a resin compatible with said thermosetting resin selected from elastomeric and thermoplastic resins, said elastomeric resin selected from neoprene resins, chloroprene resins, natural rubbers, butadiene-styrene resins, butadiene-acrylonitrile resins and mixtures thereof; and said thermoplastic resin is selected from polyvinyl resins, polyacrylic resins, polymethacrylic resins and mixtures thereof; the fatty acids dispersed throughout said resin composition.

2. Article of claim 1 wherein said soap is selected from zinc, calcium, lead, barium, strontium, aluminum and cadmium stearates and palmitates and mixtures thereof, said nonloading coating being dry and cured.

3. Article of claim 1 wherein said thermosetting resin is urea-formaldehyde, said thermoplastic resin is polyvinyl alcohol and said soap is zinc stearate.

4. Article of claim 1 including in said nonloading coating up to 25 parts by weight of a filler.

5. Article of claim 2 wherein amount of said resin composition is from 8 to 10 parts by weight and amount of said soap is also from 8 to 10 parts by weight.

6. Article of claim 1 wherein said article is sandpaper and said backing is selected from paper, cloth and plastic.